US007672475B2

(12) United States Patent
O'Doherty et al.

(10) Patent No.: US 7,672,475 B2
(45) Date of Patent: Mar. 2, 2010

(54) METHOD AND APPARATUS FOR VERIFYING A HOLOGRAM AND A CREDIT CARD

(75) Inventors: Phelim A. O'Doherty, Dublin (IE); Patrick J. Smith, Dublin (IE); Carlos Luna, Dublin (IE); Sean D. McCarthy, Dublin (IE)

(73) Assignee: Fraudhalt Limited (IE)

( * ) Notice: Subject to any disclaimer, the term of this patent is extended or adjusted under 35 U.S.C. 154(b) by 497 days.

(21) Appl. No.: 10/968,678

(22) Filed: Oct. 19, 2004

(65) Prior Publication Data

US 2005/0129282 A1 Jun. 16, 2005

(30) Foreign Application Priority Data

Dec. 11, 2003 (IE) .............................. S2003/0929

(51) Int. Cl.
*G06K 9/00* (2006.01)
*G06K 9/76* (2006.01)
*G06K 9/74* (2006.01)

(52) U.S. Cl. .......................... 382/100; 382/210; 356/71

(58) Field of Classification Search ................. 382/100, 382/210; 356/71, 429, 445, 448, 364–369
See application file for complete search history.

(56) References Cited

U.S. PATENT DOCUMENTS

| | | | | |
|---|---|---|---|---|
| 4,501,439 | A | 2/1985 | Antes | 283/91 |
| 4,761,543 | A | 8/1988 | Hayden | 235/457 |
| 5,623,347 | A | 4/1997 | Pizzanelli | 359/2 |
| 5,754,690 | A * | 5/1998 | Jackson et al. | 382/199 |
| 5,943,131 | A * | 8/1999 | Dausmann et al. | 356/457 |
| 6,473,165 | B1 * | 10/2002 | Coombs et al. | 356/71 |

FOREIGN PATENT DOCUMENTS

| | | |
|---|---|---|
| DE | 29819954 | 3/1999 |
| FR | 2785697 | 5/2000 |

* cited by examiner

*Primary Examiner*—John B Strege
(74) *Attorney, Agent, or Firm*—Seyfarth Shaw LLP; Brian Michaelis

(57) ABSTRACT

A method for verifying a hologram, comprising the steps of reading at least two images of the hologram, the images being representative of images derived at respective different viewing angles, comparing a characteristic derived from the respective images with a reference characteristic to establish if the hologram is authentic, and outputting a signal indicative of the authenticity or otherwise of the hologram.

18 Claims, 3 Drawing Sheets

METHOD AND APPARATUS FOR VERIFYING A HOLOGRAM AND A CREDIT CARD

RELATED APPLICATIONS

This application claims priority from Irish Short Term Patent Application No. S2003/0929, filed Dec. 11, 2003, which is incorporated herein by reference.

FIELD OF THE INVENTION

The present invention relates to a method and apparatus for verifying a hologram, and in particular, for verifying a hologram on a credit card, such as a credit, debit or charge card, an ID card, a security card, a keycard or the like, as well as a hologram on a document, such as a deed, a security document, a label, an admission ticket, a currency note, a label for a medicine or a packet for a medicine, or other such document, label, package, or card. The invention also relates to a method and apparatus for verifying a credit card.

BACKGROUND OF THE INVENTION

With the ever increasing amount of credit card fraud, it is essential that the authenticity of credit cards be accurately verified. The term "credit card" used in this specification is intended to include any type of credit, debit or charge card, as well as an ID card, a security card, a keycard or the like in which a hologram is provided on the card. In general, credit cards are provided with a hologram for facilitating both visual and machine verification of the credit card. Visual verification of a hologram of a credit card is carried out by visually inspecting the card in white light. By tilting the card relative to the light, the hologram can be viewed from different angles, thus permitting visual verification of the authenticity of the hologram. One method of machine verification requires directing light of different wavelengths at the hologram, and measuring the diffraction of the light. However, it has been found that this method is of limited value, and counterfeit holograms can be prepared relatively simply which provide for diffraction of light of the respective different wavelengths to accurately simulate diffraction of light by an authentic hologram.

There is therefore a need for a method and apparatus for verifying a hologram which overcomes this and other problems of known verification methods and apparatus.

SUMMARY OF THE INVENTION

The present invention is directed towards providing such a method and apparatus, and the invention is also directed towards a method and apparatus for verifying a credit card.

According to the invention there is provided a method for verifying a hologram, the method comprising the steps of reading at least two images of the hologram, the images being representative of images derived at respective different viewing angles, comparing a characteristic derived from the respective images with a reference characteristic to establish if the hologram is authentic, and outputting a signal indicative of the authenticity or otherwise of the hologram.

In one embodiment of the invention the respective images are derived by illuminating the hologram with light directed towards the hologram at respective different angles. Preferably, the hologram is illuminated by monochromatic light, and advantageously, by parallel monochromatic light.

In another embodiment of the invention the images are derived from light diffracted from the hologram.

In another embodiment of the invention a plurality of first light sources are provided for illuminating the hologram, the respective first light sources being located for directing the light therefrom at respective different angles to the hologram. Preferably, at least two first light sources are provided.

Preferably, the first light sources are located in a common first plane which extends at an angle greater than zero to the plane of the sheet on which the hologram is provided. Advantageously, the common first plane containing the respective first light sources extends at an angle in the range of 60° to 120° to the plane of the sheet on which the hologram is provided, and preferably, the common first plane containing the first light sources extends at an angle of approximately 90° to the plane of the sheet on which the hologram is provided. Ideally, the common first plane in which the first light sources are contained is a plane that when the hologram is sequentially illuminated by the first light sources respective two dimensional images of the hologram are obtained, and ideally the common first plane is selected to be matched to the wavelength of the monochromatic light so that the hologram is responsive to the monochromatic light directed in the common first plane incident on the hologram for diffracting the light to form the two dimensional image.

In another embodiment of the invention the respective images of the hologram are electronically read, and preferably, the respective images are formed in an image plane in an electronic camera, and advantageously, in a charge-coupled device type camera.

In one embodiment of the invention the camera is located in a second plane at an angle to the plane of the sheet on which the hologram is provided, and at an angle to the first plane. Preferably, the second plane is selected to be at an angle to the first plane so that the monochromatic light of the first light sources diffracted from the hologram is diffracted in the selected second plane to form the two dimensional image.

In one embodiment of the invention the second plane is at an angle of 90° to the first plane, and if the first plane is at an angle of 90° to the plane of the sheet on which the hologram is provided, typically the second plane is at an angle of 90° to the sheet on which the hologram is provided.

In another embodiment of the invention a bitmap of the respective images of the hologram are formed in the image plane of the camera.

In one embodiment of the invention a value of a characteristic of at least some of the pixels of the bitmap of each image is computed, and the computed values of the characteristic are compared with corresponding reference values, and if the computed values compare favourably with the reference values, the hologram is verified as being a valid hologram.

Alternatively, difference values of a characteristic of corresponding pixels of at least some of the pixels of two of the images are computed, and the difference values of the characteristic of the respective pixels are compared with corresponding reference difference values, and if the difference values compare favourably with the reference difference values, the hologram is verified as being a valid hologram. In one embodiment of the invention the characteristic of each pixel which is computed is the illumination level of the pixel.

In one embodiment of the invention, the value of the characteristic of all of the pixels of the bitmap of two of the images is computed.

In another embodiment of the device, multiple cameras are used with a single light source. The cameras are of the same type as before, and the light source may be monochromatic or may have a broad spectrum, for example a white LED. The cameras are then arranged so that they are distributed throughout the viewing angle of the hologram, instead of, as before, a single camera at one position in this range. The light source is placed so as to reconstruct the hologram, in the place of the central light source in the previous embodiment.

The invention also provides a method for verifying a credit card, which comprises the method according to the invention for verifying a hologram.

In one embodiment of the invention the method for verifying a credit card further comprises determining the location of the hologram on the credit card for verification thereof, and preferably, the location of the hologram on the credit card is determined by illuminating the hologram with diffused light for defining an outline of the hologram, and the credit card is illuminated from the rear for defining at least one edge of the credit card, and the method comprises the step of determining at least one dimension between an edge of the credit card and a corresponding edge of the hologram for determining the location of the hologram on the credit card.

In another embodiment of the invention two dimensions of the hologram from corresponding edges of the credit card are determined.

In another embodiment of the invention each dimension of the edge of the hologram from the corresponding edge of the credit card is compared with a corresponding reference dimension.

In a further embodiment of the invention the method for verifying a credit card includes the step of reading at least a part of a credit card number encoded in the credit card, typically, encoded in a magnetic strip of the credit card, and capturing an image of a corresponding part of the credit card number embossed on the credit card, and reading the captured image, and comparing the captured part of the embossed number with the corresponding part of the encoded number for verifying the credit card.

The invention also provides apparatus for verifying a hologram on a document, the apparatus comprising a reading means for reading at least two images of the hologram, the images being representative of images derived at respective different viewing angles, a comparing means for comparing a characteristic derived from the respective images with a reference characteristic to establish if the hologram is authentic, and an output means responsive to the comparing means for outputting a signal indicative of the authenticity or otherwise of the hologram.

In one embodiment of the invention a first illuminating means is provided for illuminating the hologram with light, the first illuminating means being arranged for directing light at respective different angles towards the hologram for simulating images derived from different viewing angles.

In another embodiment of the invention the first illuminating means comprises a plurality of first light sources provided for directing light at the respective different angles towards the hologram. Preferably, at least two first light sources are provided.

In one embodiment of the invention each first light source is a monochromatic light source, and preferably, each first light source outputs parallel monochromatic light. Ideally, the first light sources are located in a common first plane extending at an angle greater than zero to the plane of the sheet on which the hologram is provided, and preferably, the common first plane extends from the sheet on which the hologram is provided at an angle in the range of 60° to 120°, and preferably, at an angle of approximately 90°. Ideally, the common first plane in which the first light sources are contained is a plane that when the hologram is sequentially illuminated by the first light sources respective two two-dimensional images of the hologram are obtained, and ideally, the common first plane is selected to be matched to the wavelength of the monochromatic light so that the hologram is responsive to the monochromatic light directed in the first plane incident on the hologram for diffracting the light to form the two dimensional image.

In a further embodiment of the invention the reading means for reading the respective images comprises an electronic camera, and preferably, a charge-coupled device type camera. Advantageously, a computing means is provided for reading the respective images formed by the camera.

In one embodiment of the invention the computing means prepares a bitmap of each image.

In one embodiment of the invention a value of a characteristic of at least some of the pixels of the bitmap of each image is computed, and the computed values of the characteristic are compared with corresponding reference values, and if the computed values compare favourably with the reference values, the hologram is verified as being a valid hologram.

Alternatively, difference values of a characteristic of corresponding pixels of at least some of the pixels of two of the images are computed, and the difference values of the characteristic of the respective pixels are compared with corresponding reference difference values, and if the difference values compare favourably with the reference difference values, the hologram is verified as being a valid hologram.

In one embodiment of the invention the characteristic of each pixel which is computed is the illumination level of the pixel.

In one embodiment of the invention, the value of the characteristic of all of the pixels of the bitmap of two of the images is computed.

The invention also provides apparatus for verifying a credit card, which comprises the apparatus according to the invention for verifying a hologram.

In one embodiment of the invention the apparatus for verifying a credit card further comprises a second illuminating means for illuminating the hologram for defining an outline of the hologram, and preferably, a third illuminating means is provided for illuminating the credit card from the rear thereof for defining at least one edge of the credit card, and preferably, an image of the hologram and an adjacent portion of the credit card is captured by the camera, and the reading means reads the image, and the computing means computes a dimension from the defined edge of the credit card and the corresponding edge of the hologram, and preferably, computes two dimensions from respective defined edges of the credit card and corresponding edges of the hologram, and preferably, the comparing means compares each computed dimension from one of the edges of the credit card to the corresponding edge of the hologram with a corresponding reference dimension.

In a further embodiment of the invention the camera is adapted for capturing an image of at least a part of a credit card number embossed on the credit card, and a magnetic strip reading means is provided for reading a corresponding part of the credit card number encoded on a magnetic strip of the credit card, and preferably, the comparing means compares the respective parts of the embossed number and the encoded number.

In one embodiment of the invention the captured image of the part of the embossed credit card number is converted to machine readable form for comparison with the encoded credit card number.

DESCRIPTION OF THE DRAWINGS

The invention will be more clearly understood from the following description of an embodiment thereof, which is given by way of example only, with reference to the accompanying drawings, in which.

DETAILED DESCRIPTION

Figure 1:
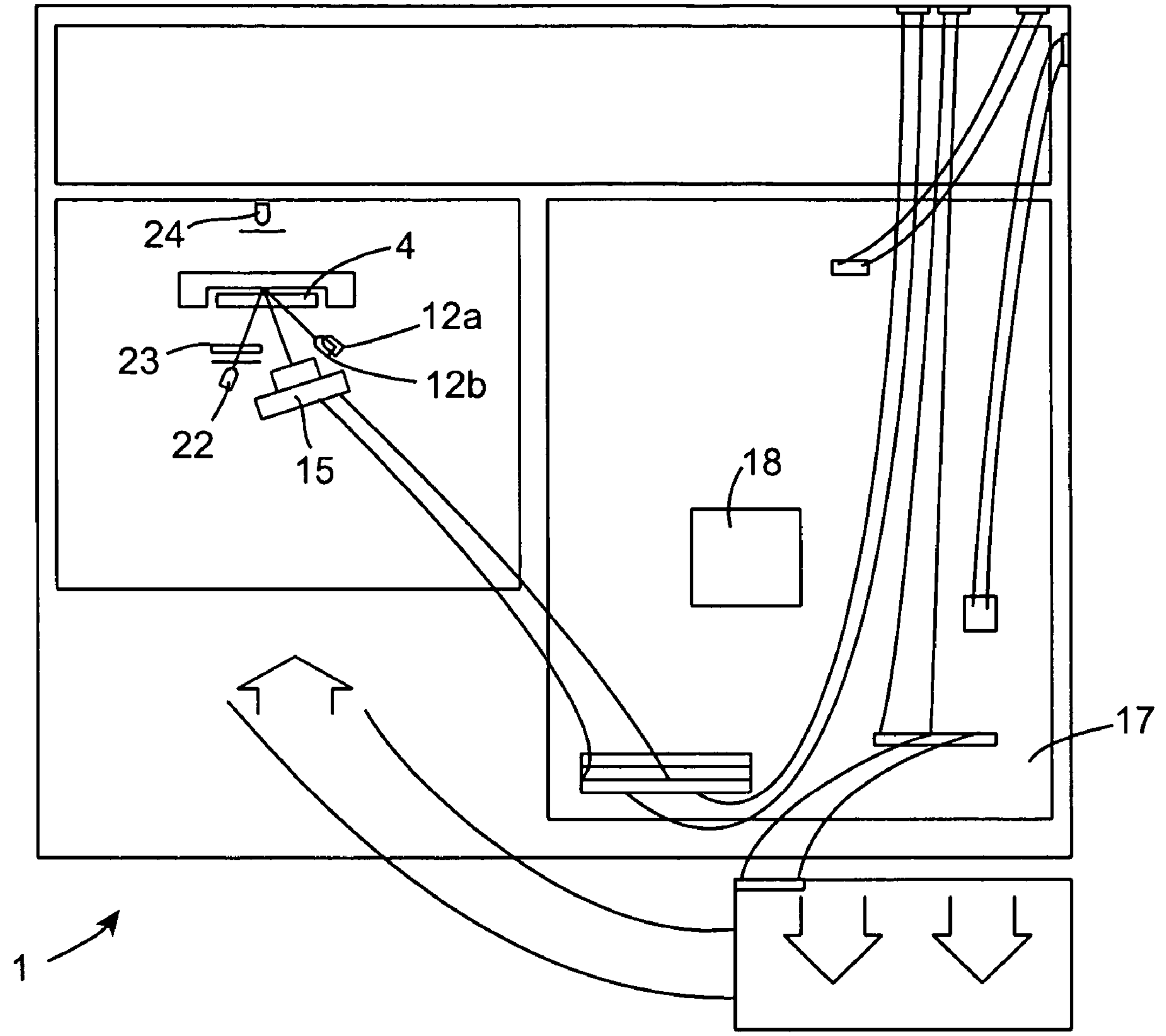
FIG. 1 is a diagrammatic top plan view of apparatus according to the invention for verifying a hologram on a credit card.

Referring to the drawings, there is illustrated apparatus according to the invention, indicated generally by the reference numeral 1, for verifying the authenticity or otherwise of a credit card 4. The apparatus verifies a credit card 4 by inter alia verifying a hologram 3 on the credit card 4 by a method according to the invention, as will be described below. The hologram 3 may contain any type of image, as will be well known to those skilled in the art, and is located on the credit card such that edges 7 and 8 of the hologram 3 are spaced apart from corresponding edges 9 and 10, respectively, of the credit card 4, by distances a and b, respectively. In this embodiment of the invention the apparatus 1 verifies the credit card 4 by carrying out three verification steps. The apparatus 1 determines the position of the hologram 3 relative to the credit card 4 by determining the dimensions a and b between the edges 7 and 8 of the hologram 3 and the corresponding edges 9 and 10 of the credit card 4. The determined dimensions a and b are compared with corresponding reference dimensions, and if they compare favourably, the credit card 4 is subjected to the second verification step, and if the determined dimensions do not favourably compare with the reference dimensions the credit card 4 is identified as a counterfeit card.

The step of verifying the hologram 3 requires that respective images of the hologram 3 should be machine read, and the images should be two dimensional images, and should be representative of images derived from different viewing angles of the hologram 3. This, as will be described below, is achieved by directing parallel monochromatic light onto the hologram 3 at two different angles and recording the respective images. Differences in a characteristic of the respective images which will be described below are computed and compared with reference difference values. If the computed difference values compare favourably with the reference difference values, the hologram is passed as being authentic, otherwise, the hologram is identified as counterfeit. Another step in verifying the credit card requires reading a part of the credit card number embossed on the credit card, and reading a corresponding part of the encoded credit card number from the magnetic strip of the credit card. If the respective corresponding parts of the embossed number and the encoded number compare, then the code is verified as being valid. In this embodiment of the invention the last four digits of the embossed and encoded credit card number are read and compared.

The holograms on a credit card are of the type which are commonly referred to as rainbow holograms. The holograms are referred to as rainbow holograms because they exhibit three dimensional parallax in only one plane of viewing angles, whereas in the orthogonal plane they split incident light spectrally into a rainbow of colours. In other words, the plane in which the three dimensional range of the images are viewable is perpendicular to the plane in which the spectral range is viewable. This is made use of in the present invention because it allows such holograms to be viewed in monochromatic light, since an image formed by diffracting light of one wavelength is visible at only one viewing angle. Hence, overlapping colours do not blur the view of the holograms reconstruction, as they would otherwise. This is a diminution of a fully three-dimensional hologram, but a correct alignment of axes for the three-dimensional and spectral effects minimises this loss. The horizontal x-axis, from the point of view of the observer, is chosen to have the three-dimensional effect. This is the axis in which parallax is normally detected in binocular vision. Accordingly the y-axis, unimportant in three-dimensional perception, is free to use for the spectral discrimination. The observer, therefore, sees a coloured three-dimensional image as intended.

Figure 2:
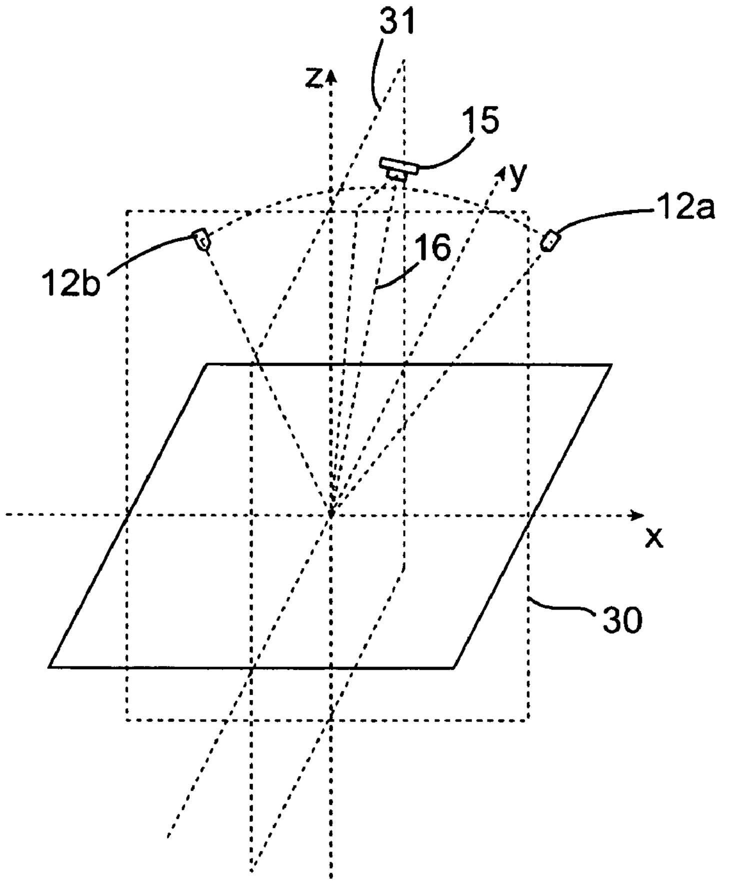
FIG. 2 is a diagrammatic perspective view of a portion of the apparatus of FIG. 1, in use.
Figure 3:
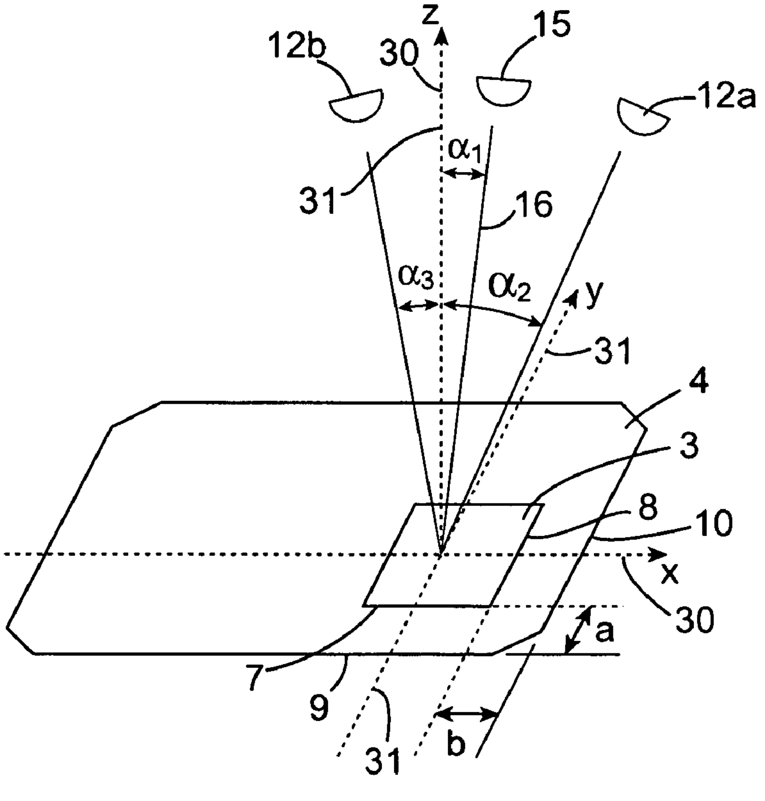
FIG. 3 is a diagrammatic perspective view of the portion of the apparatus of FIG. 2 also in use.

In FIGS. 2 and 3 the hologram 3 is illustrated in the x-y plane. The plane containing the three-dimensional range is the z-x plane, and is indicated by the reference numeral 30. The plane containing the spectral range is the z-y plane, and is indicated by the reference numeral 31. In this embodiment of the invention the images of the hologram are obtained in the z-x plane, namely, the three-dimensional range plane 30.

Referring now in particular to FIGS. 2 and 3, a first illuminating means comprising two first monochromatic parallel light sources 12*a* and 12*b* sequentially direct monochromatic parallel light at the hologram 3 at respective different angles, to the surface of the credit card 4 in a common first plane, namely, the z-x plane 30, so that two images of the hologram 3 are derivable from the hologram 3. A reading means comprising a charge-coupled device type camera 15 sequentially captures the respective diffracted images. The camera 15 is located in a second plane, namely, the z-y plane 31, so that the second plane is perpendicular to the first plane. The camera 15 is located with the axis 16 of its viewing cone angle at an angle $\alpha_1$ to the z-axis, while the first and second light sources direct light to the hologram at respective angles $\alpha_2$ and $\alpha_3$ to the z-axis. In this embodiment of the invention the angle $\alpha_1$ is approximately 15°, and the sum of the angles $\alpha_2$ and $\alpha_3$ is approximately 30°.

By illuminating the hologram with the light from the first light sources 12*a* and 12*b* in the z-x plane 30, two two-dimensional images of the hologram are captured by the camera 15 in the z-y plane 31.

Referring to FIG. 1, a control circuit 17 which comprises a microprocessor 18 reads output signals from the camera 15, and prepares a bitmap of each image. In this embodiment of the invention a value of a characteristic, namely, the light intensity of each pixel in the bitmaps of the respective images is computed. Difference values of the light intensity between corresponding pixels of the two bitmaps are then computed, and the computed difference values of the light intensities of the respective pixels are compared with corresponding reference difference values. If the computed difference values compare favourably with the reference difference values, then the hologram is verified as being valid. Otherwise, the credit card is deemed to be a counterfeit.

Alternatively, instead of computing difference values of the light intensity of the corresponding pixels of the respective bitmaps, once the light intensity values of the pixels of each bitmap have been computed, they may be compared directly with corresponding reference light intensity values. If the computed light intensity values compare favourably with the corresponding reference light intensity values, then the hologram would be verified as a valid hologram, or otherwise would be deemed a counterfeit.

A second illuminating means, in this embodiment of the invention a second light source 22 directs white light through a diffuser 23 at the hologram 3 for providing an illuminated image of the entire hologram so that the peripheral edges 7 and 8 of the hologram 3 can be identified and an image thereof formed in the camera 15. A third light source 24 directs white light at the credit card 4 at the back thereof for defining the edges 9 and 10 of the credit card 4 so that an image of the respective edges 9 and 10 of the credit card 4 is also formed in the camera 15 simultaneously with the image of the entire hologram. The microprocessor 18 reads signals from the camera 15 and forms respective bitmaps of the portion of the credit card 4 adjacent the edges 9 and 10 and adjacent the edges 7 and 8 of the hologram 3 so that the dimensions a and b can be computed. The microprocessor 18 then compares the respective dimensions a and b with corresponding reference dimensions, and if the computed dimensions a and b compare favourably with the respective reference dimensions, the location of the hologram on the credit card is verified as being correct. If the computed dimensions a and b do not compare favourably with the reference dimensions, the credit card 4 is deemed to be a counterfeit card.

The last four digits of the credit card number embossed on the credit card adjacent the hologram 3 are also captured by the camera 15 and read by the microprocessor 18, and in turn converted into machine readable characters. A magnetic strip reader (not shown) is provided in the apparatus 1 for reading the magnetic strip of the credit card, and the magnetic strip reader (not shown) reads the last four digits of the credit card number encoded on the credit card. The microprocessor compares the last four encoded digits of the credit card number with the last four embossed digits of the credit card number, and if the two numbers correspond, then the number on the credit card is verified as being valid. If not the credit card is deemed a counterfeit.

The order of the verifying of the hologram, its position on the credit card and the verification of the last four digits of the credit card number may be carried out in any order or substantially simultaneously.

Figure 4:
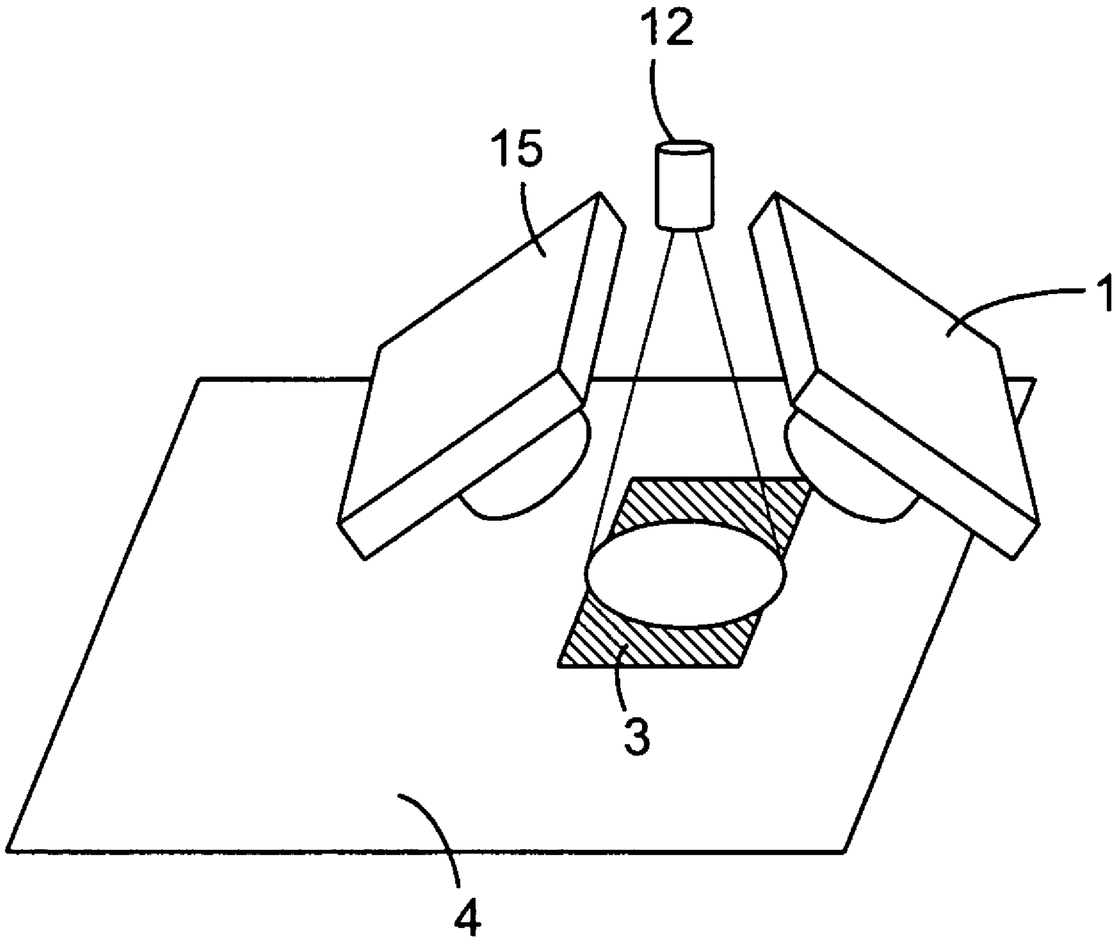
FIG. 4 illustrates an alternative embodiment of the invention implemented with multiple cameras and a single light source.

In another embodiment of the device, illustrated in FIG. 4, multiple cameras are used with a single light source. The cameras are of the same type as before, and the light source may be monochromatic or may have a broad spectrum, for example a white LED. The cameras are then arranged so that they are distributed throughout the viewing angle of the hologram, instead of, as before, a single camera at one position in this range. Each camera captures the reconstruction from a different angle, to provide varying pictures of the hologram. The light source is placed so as to reconstruct the hologram, in the place of the central light source in the previous embodiment.

One advantage of this arrangement over the previous embodiment is that all the hologram images may be captured simultaneously from the multiple cameras, thus saving time in operation. Additionally, the light source need not be switched and synchronised with camera shuttering; it can be illuminated whenever the device is operating. Hence the device merely needs to make sure that the hologram is in place before capturing images.

One drawback, however, is the increased complexity and size of the device, with the accompanying difficulty in accommodating multiple cameras in the limited space around the hologram.

Use of a broad-spectrum light source relaxes the tolerance on the viewing angles of the cameras, since coloured hologram reconstructions will be generated in a range of angles. The cameras will see some colour of hologram reconstruction from a wider range of viewing positions than before—typically a reconstruction whose colour varies from top to bottom as the angle between light source, hologram and camera varies. This has the immediate advantage of making the device simpler to design and construct, and also means that more of the hologram reconstruction is available for image comparison.

Moreover, the use of colour cameras allows the captured images to be split into colour planes, that is, the red, green and blue pictures that comprise the colour image. This can then serve as the basis of a further test of the hologram response, since now the reconstruction of the hologram under various wavelengths of illumination can be examined. Hence this device is capable, should it be necessary, of verifying the hologram's behaviour in the spectral axis as well as the 3D axis. This can be useful, for example, for holograms that show little parallax shift but which have 'coloured' elements with characteristic spectral responses. An example of this would be text of different colours but in the same plane, which is seen in some credit card holograms.

It is envisaged that in this embodiment, the device would be able to apply the appropriate test from amongst its range of possible modes of operation, in order to verify the particular hologram with which it is presented. Some hologram types may be securely verified by the parallax shift as described previously, and some by the spectral shift as outlined here.

While the method for verifying the authenticity of the hologram has been described as requiring the computation of the light intensity of every pixel of the bitmaps of the respective images, in certain cases, it should be appreciated that the light intensity of only some of the pixels, which would be predetermined pixels would be computed. The limited set of predetermined pixels would be either compared with corresponding reference values, or difference values of the computed light intensity may be determined and compared with corresponding reference difference values. Other suitable methods for comparing bitmaps may be used for determining the authenticity of the hologram.

It should also be appreciated that while the method has been described as requiring only two images to be read, the method may include provisions for reading many more images of the hologram, and in which case, it is envisaged that an appropriate number of first parallel monochromatic light sources would be provided for facilitating the reading of the respective images.

While the method and apparatus according to the invention have been described as also verifying the last four digits of the credit card number, while this is an added advantage, it is not essential, and furthermore some greater or lesser number of digits of the credit card number may be read as an optional verification procedure.

While the method for verifying a credit card has also been described as including verifying the location of the hologram on the credit card, while this is advantageous, it is not essential to the invention. Indeed, it is envisaged that in certain cases only the hologram itself will be verified.

Further, it will be appreciated that while the method for verifying a hologram has been described for verifying a hologram on a credit card, the method for verifying a hologram may be used for verifying a hologram on any other document. Typical documents on which holograms may be provided are discussed in the introduction to the specification, and it should be appreciated that this is not an exhaustive list of such documents or cards.

While the angles $\alpha_1$, $\alpha_2$ and $\alpha_3$ have been described as being of specific values, the angle $\alpha$will be determined by the colour of the monochromatic light, and the sum of the angles $\alpha_1$ and $\alpha_2$ can vary from 10° upwards, but typically, would be in the order of 30° as a function of the application.

Although the invention is described hereinbefore with respect to illustrative embodiments thereof, persons having ordinary skill in the art should appreciate that the foregoing and various other changes, omissions and additions in the form and detail thereof may be made without departing from the spirit and scope of the invention.

What is claimed:

1. A method for verifying a hologram, the method comprising the steps of:

receiving at least two 2-dimensional images of the hologram, the 2-dimensional images being representative of images derived at respective different viewing angles;

preparing a bitmap of each of the at least two 2-dimensional images of the hologram;

computing difference values of corresponding pixels in each of the bitmaps of the at least two 2-dimensional images of the hologram;

comparing difference values of a characteristic derived from the bitmaps of the at least two 2-dimensional images with a corresponding 2-dimensional reference characteristic to establish if the hologram is authentic; and outputting a signal indicative of the authenticity or otherwise of the hologram in response to comparing the difference values of the characteristic derived from the bitmaps of the at least two 2-dimensional images with the corresponding 2-dimensional reference characteristic.

2. The method of claim 1 wherein the bitmaps of the at least two 2-dimensional images are derived by illuminating the hologram with light directed towards the hologram at respective different angles.

3. The method of claim 1 wherein the hologram is illuminated by monochromatic light.

4. The method of claim 1 wherein the hologram is illuminated by parallel monochromatic light.

5. The method of claim 1 wherein the bitmaps of the at least two 2-dimensional images are derived from light diffracted from the hologram.

6. The method of claim 2 wherein illuminating is effected by providing at least one light source for illuminating the hologram, the at least one light source being located for directing the light therefrom to the hologram.

7. The method of claim 6 wherein the at least one light source is a plurality of first light sources and light is directed at respective different angles to the hologram.

8. The method of claim 7 wherein the first light sources are located in a common first plane which extends at an angle greater than zero to a plane of a sheet on which the hologram is provided.

9. The method of claim 8 wherein the common first plane containing the respective first light sources extends at an angle in a range of 60° to 120° to the plane of the sheet on which the hologram is provided.

10. The method of claim 8 wherein the common first plane containing the first light sources extends at an angle of approximately 90° to the plane of the sheet on which the hologram is provided.

11. The method of claim 8 wherein the common first plane in which the first light sources are contained is a plane that when the hologram is sequentially illuminated by the first light sources respective two dimensional images of the hologram are obtained.

12. The method of claim 8 wherein the common first plane is selected to be matched to a wavelength of the monochromatic light so that the hologram is responsive to the monochromatic light directed in the common first plane incident on the hologram for diffracting the light to form the two dimensional image.

13. The method of 1 wherein the bitmaps of the at least two 2-dimensional images of the hologram are electronically read, and the at least two 2-dimensional images are formed in an image plane in at least one electronic camera.

14. The method of claim 13 wherein the at least one camera is located in a second plane at an angle to a plane of a sheet on which the hologram is provided, and at angles to a common first plane in which at least one light source is located for illuminating the hologram.

15. The method of claim 1 further wherein the step of preparing a bitmap of each of the at least two 2-dimensional images of the hologram, and the further step of computing difference values of corresponding pixels involves selecting a characteristic of each of the at least two 2-dimensional images represented by at least some pixels of the bitmap of each image and wherein computed values of the characteristic are compared with corresponding reference values, and if the computed values compare favourably with the reference values, the hologram is verified as being a valid hologram.

16. An apparatus for verifying a hologram on a document, the apparatus comprising;

a reading means for reading at least two 2-dimensional images of the hologram, the images being representative of images derived at respective different viewing angles;

a generating means for generating a bitmap of the at least two 2-dimensional images;

a computing means for computing difference values of corresponding pixels in each of the bitmaps of the at least two 2-dimensional images;

a comparing means for comparing difference values of a characteristic derived from the bitmaps of the at least two 2-dimensional images with a 2-dimensional reference characteristic to establish if the hologram is authentic, and an output means responsive to the comparing means for outputting a signal indicative of the authenticity or otherwise of the hologram.

17. The apparatus of claim 16 further including a first illuminating means for illuminating the hologram with light, the first illuminating means being arranged for directing light at respective different angles towards the hologram for simulating images derived from different viewing angles.

18. The apparatus of claim 17 wherein the first illuminating means comprises a plurality of first light sources provided for directing light at the respective different angles towards the hologram, and each of said illuminating means is a monochromatic light located in a common first plane extending at an angle greater than zero to the plane of the sheet on which the hologram is provided.

* * * * *